(No Model.) 7 Sheets—Sheet 1.

C. R. MAHONE.
PLUG TOBACCO MACHINE.

No. 582,657. Patented May 18, 1897.

Witnesses:
Herbert Bradley
Jno. W. White

Inventor:
Charles R. Mahone
By Knight Bros
Attorneys (No Model.) 7 Sheets—Sheet 2.

C. R. MAHONE.
PLUG TOBACCO MACHINE.

No. 582,657. Patented May 18, 1897.

(No Model.)

7 Sheets—Sheet 3.

C. R. MAHONE.
PLUG TOBACCO MACHINE.

No. 582,657. Patented May 18, 1897.

Witnesses:
Herbert Bradley
Jas W White

Inventor
Charles R. Mahone
By Knight Bros
Attorneys

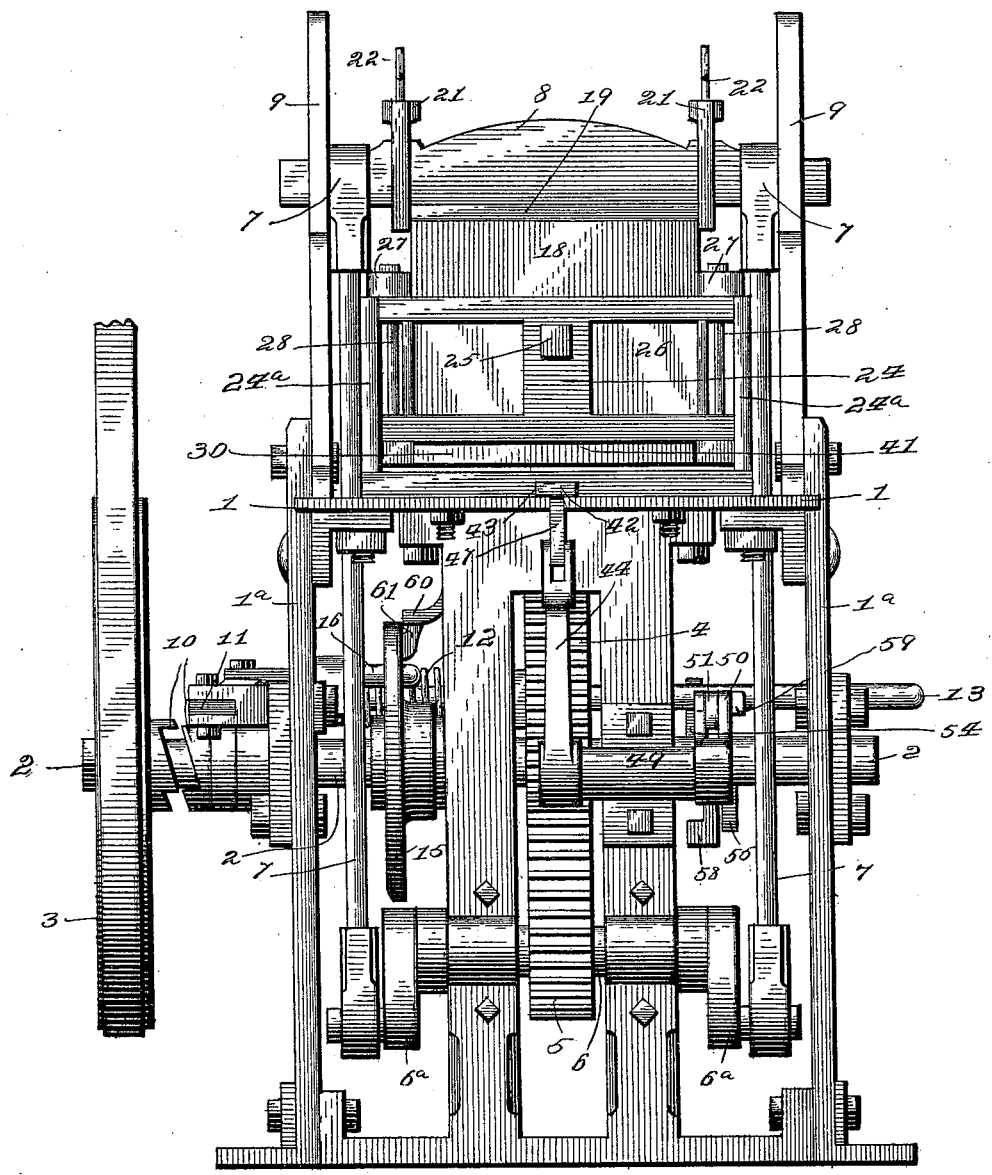

(No Model.) 7 Sheets—Sheet 5.
C. R. MAHONE.
PLUG TOBACCO MACHINE.
No. 582,657. Patented May 18, 1897.
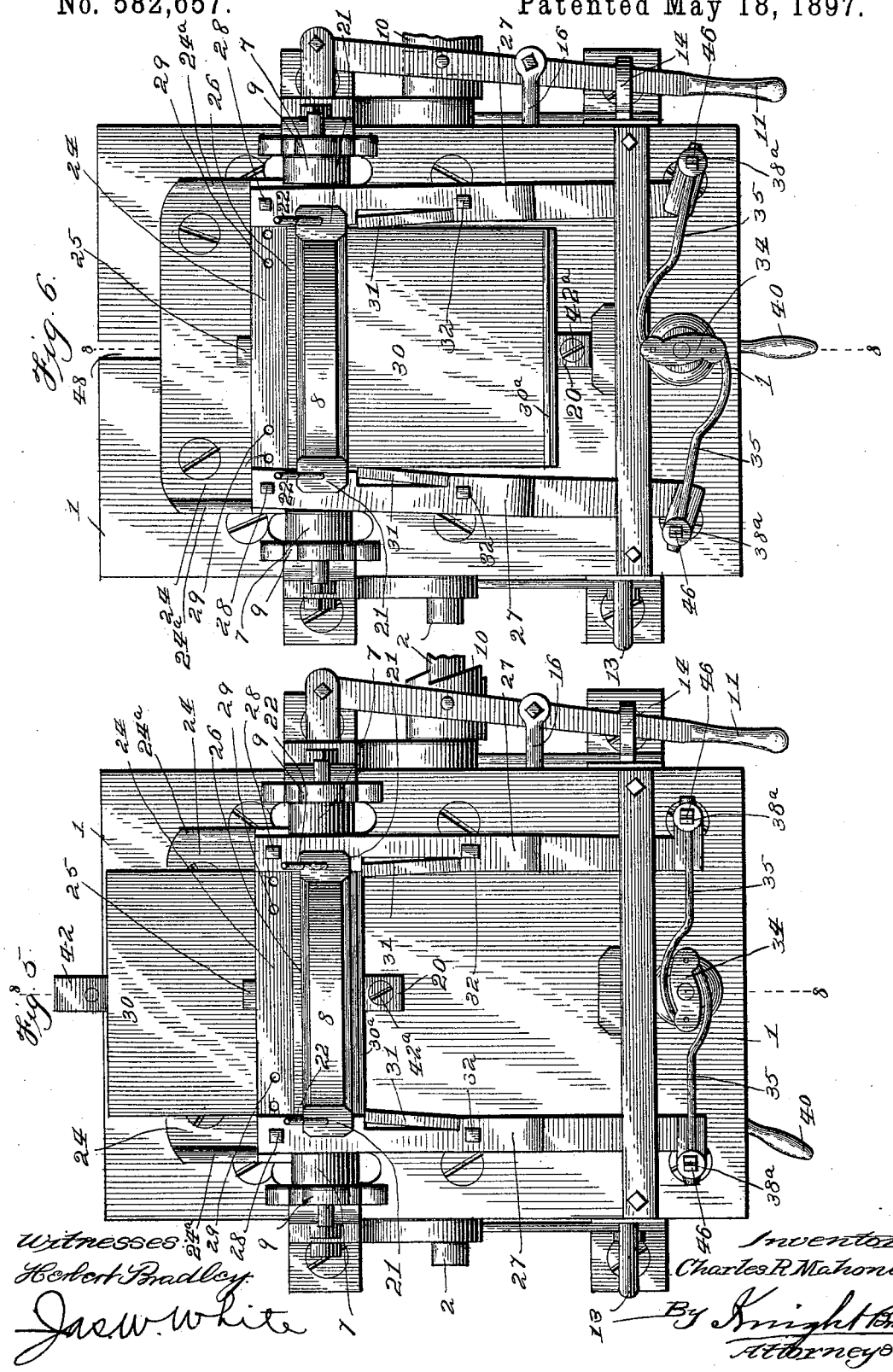
Witnesses
Herbert Bradley
Jas. W. White
Inventor
Charles R. Mahone
By Knight Bro.
Attorneys (No Model.) 7 Sheets—Sheet 6.
C. R. MAHONE.
PLUG TOBACCO MACHINE.
No. 582,657. Patented May 18, 1897.
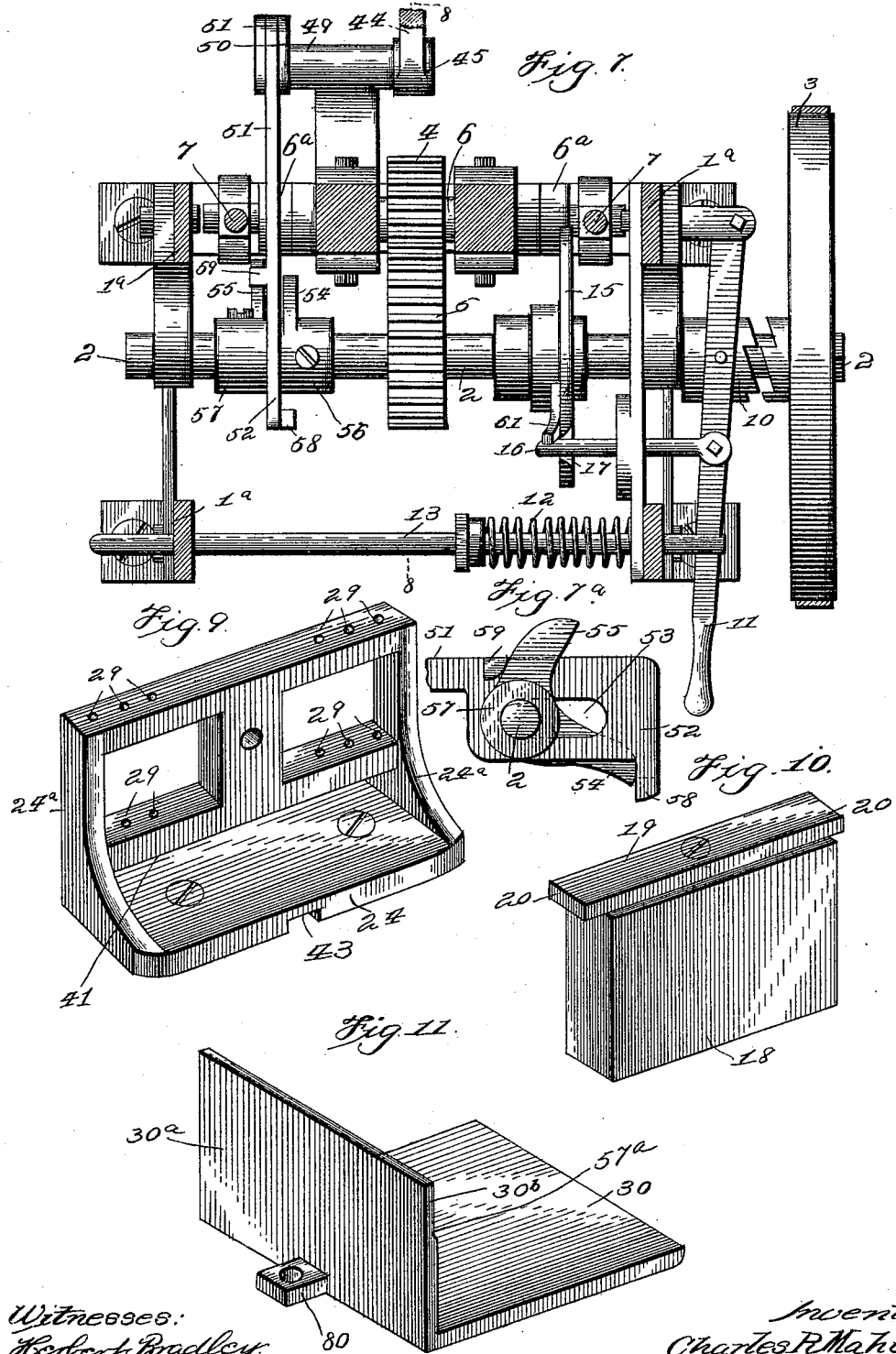
Witnesses:
Herbert Bradley
Jas. W. White
Inventor:
Charles R. Mahone.
By Knight Bros
Attorneys (No Model.) 7 Sheets—Sheet 7.

C. R. MAHONE.
PLUG TOBACCO MACHINE.

No. 582,657. Patented May 18, 1897.

Witnesses:
Herbert Bradley.
Jas. W. White.

Inventor:
Charles R. Mahone
By Knight Bros
Attorneys.

UNITED STATES PATENT OFFICE.

CHARLES R. MAHONE, OF RICHMOND, VIRGINIA, ASSIGNOR OF ONE-FOURTH TO JOHN W. ATKINSON, OF SAME PLACE.

PLUG-TOBACCO MACHINE.

SPECIFICATION forming part of Letters Patent No. 582,657, dated May 18, 1897.

Application filed May 12, 1896. Serial No. 591,287. (No model.)

*To all whom it may concern:*

Be it known that I, CHARLES R. MAHONE, a citizen of the United States, residing at Richmond, in the county of Henrico and State of Virginia, have invented a new and useful Plug-Tobacco Machine, of which the following is a specification.

My invention relates to a machine which is designed to press tobacco into plugs or lumps of various marketable sizes in making what is known as "plug-tobacco;" and my invention consists, as will hereinafter be fully described and particularly pointed out in the claims, in certain novel features of construction whereby the general construction of the machine is simplified, making the driving of the machine easier and more effective, rendering the control of the machine more convenient by making it possible to stop the plunger at either limit of its movement for any desired length of time by a suitable clutch while automatically maintaining the engagement of the clutch in the meantime, or, if desired, having the interruption of the plunger's movement take place only as it reaches its upper limit and having the engagement of the clutch automatically maintained during the complete stroke, making the opening and closing of the molds automatic, and making it more convenient to adjust the dimensions of the mold.

Figure 1:
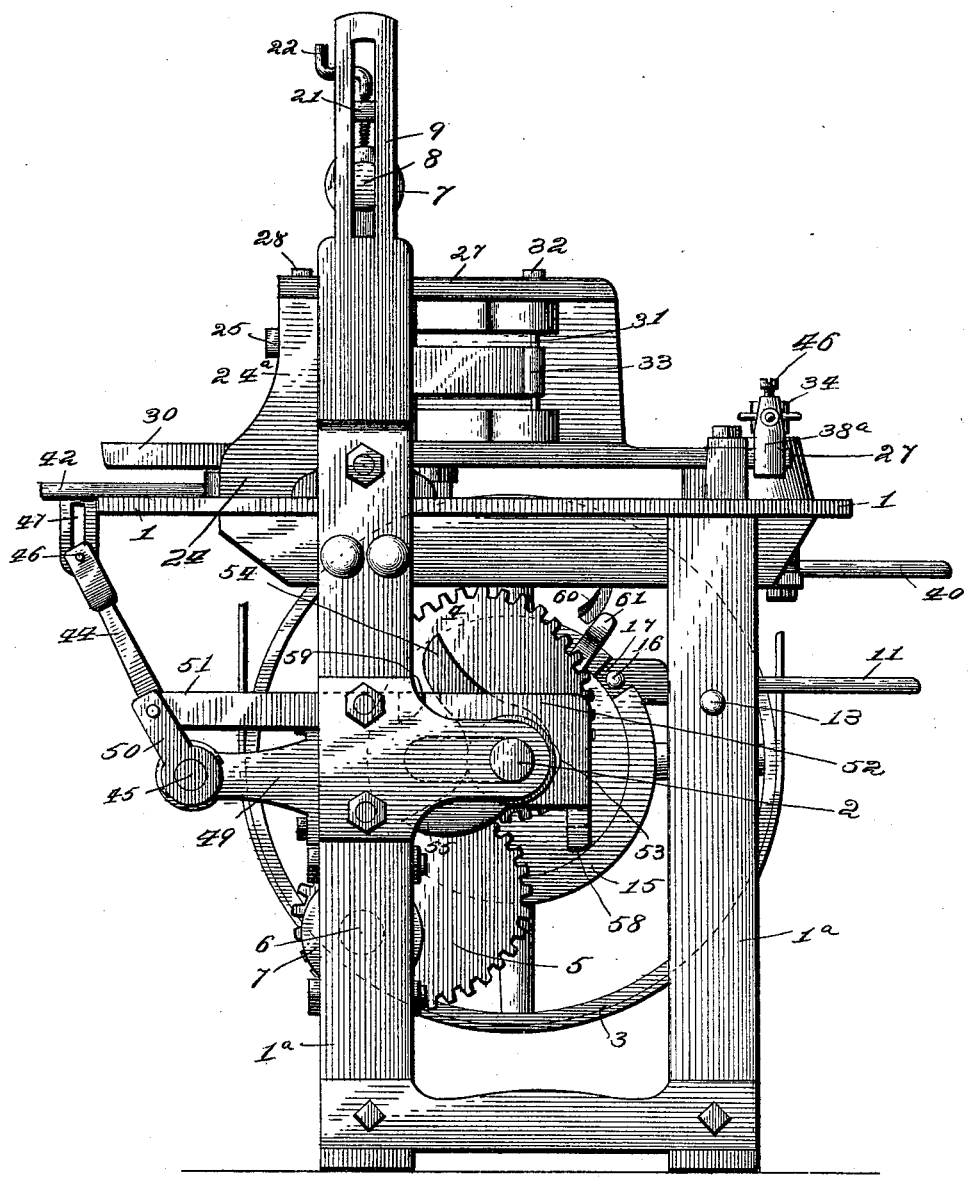
Figure 2:
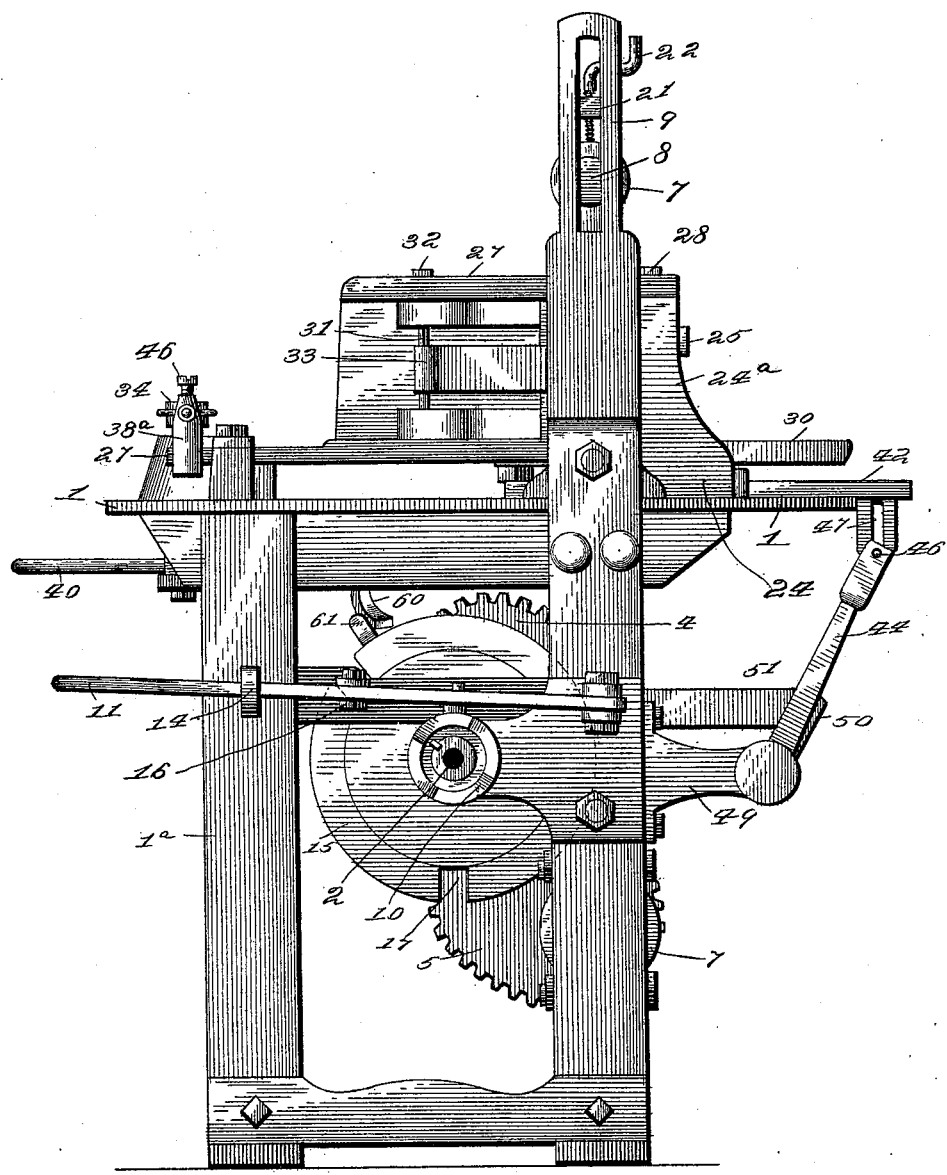
Figure 3:
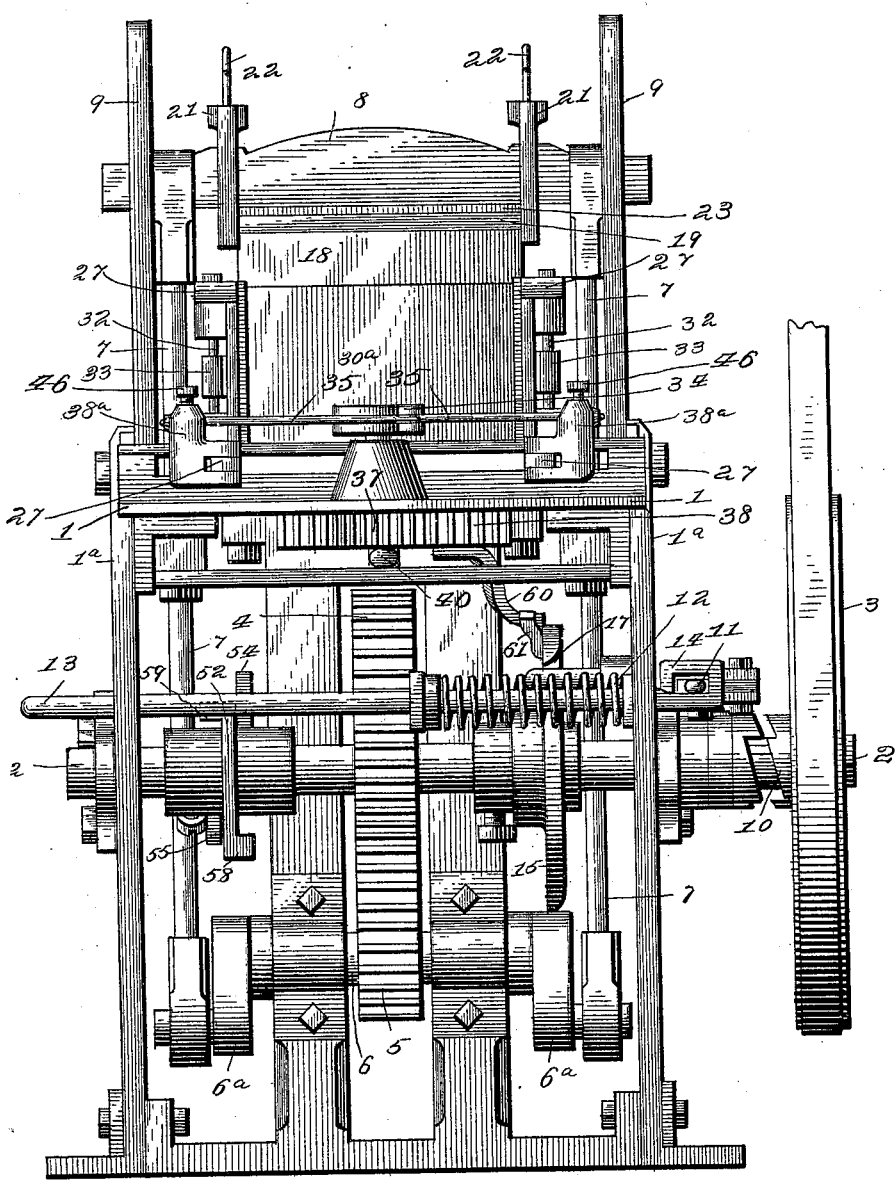
Figure 8:
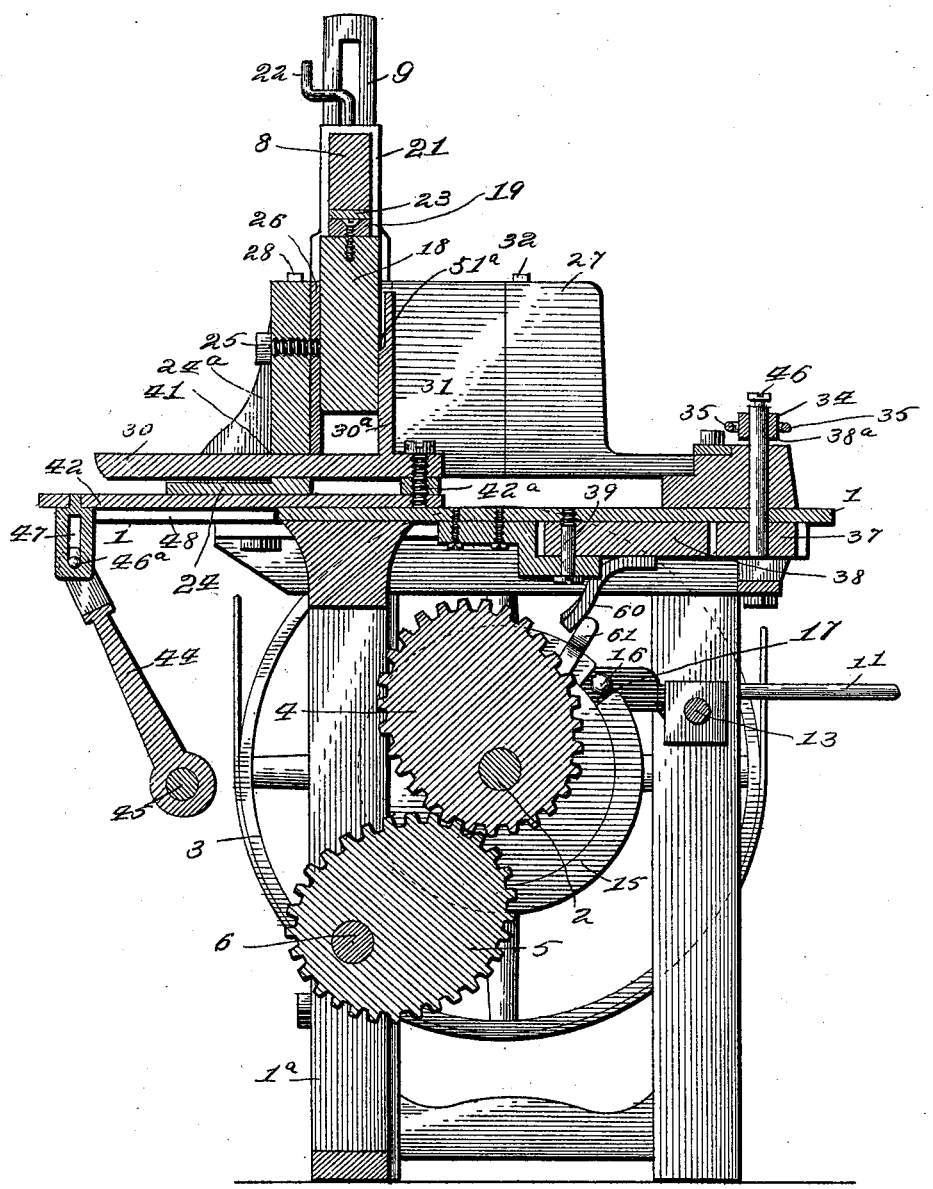

In the accompanying drawings, Figure 1 is an elevation of the left side of the machine. Fig. 2 is a similar view of the opposite side, the driving-wheel being omitted. Fig. 3 is a front view. Fig. 4 is a rear view. Fig. 5 is a top plan. Fig. 6 is a similar view with the molding-box open. Fig. 7 is a plan of the driving mechanism. Fig. 7ª is a detail view of the cams on the main shaft and the reciprocating frame for opening and closing the mold-box. Fig. 8 is a vertical section on the line 8 8, Figs. 5, 6, and 7. Fig. 9 is a perspective view of the permanent back. Figs. 10 and 11 are respectively a perpective view of one of the interchangeable plungers and a perspective view of a sliding bottom with its integral front wall.

The driving mechanism is mounted under a suitable table 1 and comprises a shaft 2, driven from any suitable source of power through the medium of balance-wheel 3, and connected by eccentrically-mounted elliptical gears 4 5 to a crank-shaft 6. The crank-shaft 6 has its cranks 6ª connected by rods 7 with the cross-head 8, so as to reciprocate said cross-head in vertical slotted standards 9, as will be presently described.

The balance or drive wheel 3, while confined against movement longitudinally on the shaft 2, is normally loose upon said shaft, but may be made to impart rotation thereto at will through the medium of clutch 10, comprising two toothed parts, one of which is fixed to the wheel 3, while the other is splined upon the shaft 2 and under control of lever 11. The lever 11 is held normally in the position of disengagement of the clutch by means of a spring 12 on a reciprocating rod 13, which is suitably mounted in the table and has connection with the lever at 14, but said clutch is held in engagement automatically while the machine is in motion. In order to hold the clutch into engagement during the entire stroke of the plunger or during each half of said stroke, as may be desired, and to release the clutch at one or both ends of the plunger's stroke, a cam 15, mounted on shaft 2, engages a push-rod 16, having connection with the lever 11, and holds said lever, and through it the clutch, in engaged position. The cam 15 has notches 17, positioned so as to receive the rod 16 as the plunger reaches the limit of its stroke and permit the clutch to be disengaged and suddenly arrest the movement of the machinery at such periods, while the drive-wheel 3 continues. As intimated, one of the notches 17 may be omitted, so that the plunger will make a complete stroke down and up and come to a rest only in elevated position. The object in employing the eccentrically-mounted elliptical gears 4 5 is to accelerate movement during the greater part of the plunger's stroke, but to retard movement and increase power when compression is actually taking place.

The manufacturing of different sizes of tobacco lumps in my machine is effected by changing the dimensions of the molding-box and employing an appropriate size of plunger for each size of tobacco to be made. One of these plungers, which is interchangeable on the machine, is represented by 18, (shown detached in Fig. 10,) and each one carries at top a hanger 19, having projecting ends 20, which may be engaged by clamps 21 on the crosshead 8. Clamps 21 carry crank-screws 22 or any equivalent clamping means which may be quickly operated. This offers means for changing the width and thickness of the plunger to correspond, respectively, with changes in the two horizontal dimensions of the box.

To provide for changing the height of the plunger and thus varying the degree of its depression, and consequently the thickness of plug, I insert one or more filling-plates 23 of uniform thickness between the hanger 19 of the plunger and the cross-head 8. This means of accomplishing this result is simple, yet very effective, and insures the corresponding adjustment of both sides of the plunger, and thereby does away with one of the most fruitful causes of breaking of machinery of this class.

The mold-box comprises a permanently-fixed back 24, supported on the table and having means, such as set-screw 25, for holding thereon any one of a number of false backs 26, interchangeable to correspond with changes in the mold-box. The mold-box further comprises swinging sides 27, hinged upon rods 28, inserted in one of a series of pairs of holes 29 in the back 24. The said back is further provided with upright ends 24ª, which engage the sides 27 and sustain them against tendency to spread when pressure is applied in the mold. The mold-box further comprises a reciprocating bottom 30, having rigid upright front 30ª, which reciprocates with said bottom to open the box to permit removal of the tobacco-plug. The front 30ª, with its sliding bottom, is sustained in closed position by means of hinged gates 31, mounted at a point intermediate in the sides 27 by hinges 32 and pressed normally inward by springs 33, so as to engage behind the front 30ª and hold the same in closed position. The forward free ends of sides 27 may be moved into closed position to cause the gates to snap in behind the moving front or thrown open to disengage the gates from said front and permit removal of the plug by a turning-head 34, connected by pitmen 35 to projections 38ª on said sides, said turning-head being arranged to lock in the closed position of the sides and being moved in and out by pinion 37 on its lower end and a segmental gear 38, engaging said pinion, pivoted at 39 beneath the table and having a controlling-lever 40.

As will be best understood from Figs. 4 and 8, the sliding bottom 30, having rigid upright front 30ª, and of which there is to be a separate one for each size of mold, reciprocates through an opening 41 in permanent back 24 and is guided in such reciprocation by the swinging sides 27. Reciprocating movement is imparted to said bottom by slide-bar 42, working in guide-opening 43, formed in the permanent back 24 beneath the bottom 30, and which is connected to said bottom at the front end by screw 42ª. The slide-bar 42 receives its movement from rock-arm 44, mounted on rock-shaft 45 and connected with said slide-bar 42 through the medium of pin 46ª, working in elongated loops 47, projecting from said slide-bar through a slot 48, Figs. 6 and 8, in table 1. Rock-shaft 45 has bearing 49, Figs. 1, 2, 4, and 7, secured to the leg 1ª of table 1, and carries at its outer end slotted crank-arm 50, which receives a rearward extension 51 on a frame 52. Frame 52 has a slot 53, by which it is movably mounted on the main shaft 2. To intermittently shift frame 52 alternately in opposite directions for correspondingly sliding the bottom 30 for opening and closing the mold-box at proper intervals, the main shaft 2 is provided with two cams 54 55, carried, respectively, by collars 56 57, fixed to said shaft on opposite sides of frame 52, and said frame has lugs or projections 58 59, positioned so as to intercept the respective cams at proper intervals. That is to say, when the plunger is down the parts have the positions shown in Fig. 1, with the cam 54 just coming in contact with the lug 58; but as soon as the plunger commences to rise continued movement of cam 54 shifts the frame 52 frontward and thereby opens the mold-box for removal of the plug and a new charge of tobacco is to be compressed.

When the parts reach the position shown in Fig. 7ª, the plunger has reached its elevation and the automatic clutch has brought the machine to rest. At this time the cam 54 has released lug 58 and cam 55 is about to engage the lug 57. As soon as the clutch is again thrown in and the machine starts, cam 55 exerts its influence on lug 59 and shoves the sliding bottom, with the rigid front, rearward and again closes the mold. This takes place before the plunger begins to exert any material pressure, and it will be understood the parts are readily timed to close the mold-box in ample time to get all of the stock beneath the plunger.

In order to provide for automatically releasing the swinging sides 27, and thereby withdrawing the gates 31 from in front of the sliding portion of the mold-box, the segmental gear 38 has a peculiarly-bent arm 60, which extends down in the path of a cam extension 61, carried by the cam 15, so that simultaneously with the rising of the plunger the arm 60 will be engaged by projection 61, the segmental gear 38 will be swung upon its pivot 39, and will transmit movement, through the pinion 37, with the turning-head 34, and release the swinging sides 27, in the manner and for the purpose explained.

When it is desired to change the width of the mold-box, the false back 26 is removed from permanent back 24 and another substituted therefor, which is long enough to give the desired length to the plug of tobacco to be made. In changing false backs the hinge-rods 28 of the swinging sides 27 are shifted in the permanent back 24 and the sides hinged in new positions to coöperate with the new false back in the same manner as with the previous one. Changes in the false backs necessitate changes in the connections of the pitmen 35 with the projections 38ª of the swinging sides, and to permit this to be done said pitmen 35 are secured to the projections 38ª by means of grips 46. This permits the free ends of the sides to be adjusted correspondingly to the changes in false backs and to maintain said sides parallel when locked in closed position. The sliding bottoms 30, with their rigid fronts 30ª, must be changed in altering the width of the mold, and for this reason they are made readily detachable from the slide-bar 42, being secured to the latter by a screw 42ª, passing through a lug 80 at the forward end, as shown. By loosening the bottom 30 and withdrawing it slightly the front 30ª may be removed and a new one inserted, after which the bottom is pushed up and tightened, when the front will be securely held under control of the slide-bar.

Changes in the depth of the mold from front to rear may be effected by different thicknesses in false backs. Inasmuch as certain standard dimensions are generally adhered to in plugs of tobacco, the change varies according to this change in the width of false backs.

To permit the front 30ª to be moved up past the swinging gates 31 when the plunger is raised, and still permit the plunger to fit tightly while pressing the tobacco, the upper portion of the front is reduced slightly by a taper, as shown at 30ᵇ.

To change the vertical dimension of the mold independently of the plunger, I employ filling-strips 23, corresponding to the hanger 19. When a plunger is employed of reduced thickness, it may be hung vertically over the mold by reducing the width of the hanger, so that it may be moved forward in the clamps on the said cross-head.

While I have described the machine as being driven by one form of power, it is obvious that any equivalent means for driving it, such as foot-power or hand-power, may be employed without departing from the spirit of my invention. Moreover, the machine may be greatly varied in minor details and still effectively perform the several functions.

Having thus described my invention, the following is what I claim as new therein and desire to secure by Letters Patent:

1. A plug-tobacco machine comprising a plunger, a hanger for the plunger having projecting ends, a cross-head, the clamps whereby the hanger is supported by its projecting ends on the cross-head, and the screws whereby the clamps are adjusted, working in the cross-head; substantially as described.

2. A plug-tobacco machine comprising a plunger, a hanger for the plunger having projecting ends, a cross-head, the clamps whereby the hanger is supported by its projecting ends on the cross-head, the filling-plate located between the hanger and the cross-head, and the screws, whereby the clamps are adjusted, working in the cross-head; substantially as described.

3. A plug-tobacco machine comprising a plunger, means for operating the plunger, the mold-box having a permanently-fixed back formed with upright ends, the swinging sides coöperating with the back, the projections on the sides, the turning-head, the pitmen connecting the turning-head with the projections, the pinion on the turning-head, and a segmental gear having a controlling-lever; substantially as described.

4. A plug-tobacco machine comprising a plunger, means for operating the plunger, the mold-box having a permanently-fixed back formed with upright ends, and movable bottom, and the swinging sides coöperating with the back and bottom, and having gates hinged thereto, and springs by which the gates are pressed normally inward; substantially as described.

5. A plug-tobacco machine comprising a plunger, means for operating the plunger, the mold-box having a permanently-fixed back, the swinging sides, a sliding bottom, having a rigid vertical front and means for automatically reciprocating the bottom; substantially as described.

6. A plug-tobacco machine comprising a plunger, means for operating the plunger, a mold-box having a permanently-fixed back formed with upright ends, the swinging sides, a sliding bottom having a rigid vertical front, and connections between the sliding bottom and the operating mechanism to move the sliding bottom in and close the mold-box before the compression by the plunger and to move the said sliding bottom out and open the mold-box after the compression; substantially as described.

7. The combination of the mold-box, the plunger and driving mechanism therefor, said mold-box being provided with hinged sides, suitable connections for closing the same, and means for opening the same, said means being provided with an arm which projects from said means and in the path of a moving part of the driving mechanism, as explained.

8. The combination of the mold-box, the plunger and driving mechanism therefor, said mold-box being provided with hinged sides, means for closing said sides and means for automatically opening said sides consisting of a turning-head, a segment having operative connection with said head, and an arm on said segment adapted to be engaged by the driving mechanism, substantially as shown and described.

9. A plug-tobacco machine comprising a plunger, means for operating the plunger having a driving-shaft, a mold-box having a fixed back and a sliding bottom having a sliding bar and means for operating the sliding bottom consisting of a rock-shaft, an arm connecting the rock-shaft with the slide-bar, a crank-arm, a frame embracing the driving-shaft, and connected with the crank-arm, and having lugs, and cams secured to the driving-shaft and adapted to engage the lugs; substantially as described.

C. R. MAHONE.

Witnesses:
CHAS. L. BARRETT,
JNO. W. ATKINSON, Jr.